United States Patent [19]

Robert et al.

[11] Patent Number: 5,135,733

[45] Date of Patent: Aug. 4, 1992

[54] PROCESS FOR PREPARING HEXAFERRITE PARTICLES

[75] Inventors: Jean-Christophe Robert, Chalon sur Saône; Pierre-Andre Mari, Givry, both of France

[73] Assignee: Eastman Kodak Company, Rochester, N.Y.

[21] Appl. No.: 678,251

[22] PCT Filed: Feb. 2, 1990

[86] PCT No.: PCT/FR89/00540

§ 371 Date: Jun. 10, 1991

§ 102(e) Date: Jun. 10, 1991

[30] Foreign Application Priority Data

Oct. 18, 1988 [FR] France ................... 8814221

[51] Int. Cl.$^5$ ............................................. C04B 35/26
[52] U.S. Cl. .................... 423/594; 252/62.59; 252/62.63
[58] Field of Search .................... 252/62.63, 62.59; 423/594

[56] References Cited

U.S. PATENT DOCUMENTS

| 4,025,449 | 5/1977 | Pezzoli et al. | 252/62.63 |
| 4,120,806 | 10/1978 | Watanabe et al. | 252/62.63 |
| 4,120,807 | 10/1978 | Watanabe et al. | 252/62.63 |

FOREIGN PATENT DOCUMENTS 0052210  5/1982  European Pat. Off. ......... 252/62.63

Primary Examiner—Jack Cooper
Attorney, Agent, or Firm—William W. Holloway

[57] ABSTRACT

The present invention concerns a process for preparing magnetic particles of barium or strontium hexaferrites exhibiting a good dispersibility and improved magnetic properties. The process involves coprecipitating an iron salt with a barium or strontium salt, filtering and neutralizing the resulting coprecipitate, and washing it with a solution of a barium or strontium salt having a concentration in the range of $2 \times 10^{-3}$ 0.2 M.

10 Claims, No Drawings

PROCESS FOR PREPARING HEXAFERRITE PARTICLES

TECHNICAL FIELD

The present invention relates to a process for preparing barium or strontium hexaferrites, which are particularly useful in magnetic recording processes.

BACKGROUND OF THE INVENTION

Barium or strontium hexaferrites are well known for their magnetic properties. In particular they exhibit a high coercive field, which is appreciated for the applications requiring such a high coercive field.

For some time, efforts have been made to develop magnetic particles, compositions or products such as discs, cards and tapes for applications requiring a good keeping of the information and/or a good resistance to falsification or accidental erasing. This is the case for credit cards, identity cards and control access cards incorporating magnetic tracks. Hexaferrites have good prospects in such applications and allow a high recording density. The preparation of barium or strontium hexaferrite particles is well known. They can be obtained by coprecipitating a ferric salt and a barium or titanium salt in alkaline solution and calcining the coprecipitate obtained at high temperature.

C. D. Mee and J. C. Jeschke in "Single-Domaine Properties in Hexagonal Ferrites", Journal of Applied Physics, Vol 34, No 4, 1271-2, 1963, disclose the preparation of such hexaferrite particles. This old process exhibits the disadvantage of giving coarse particles which are non-homogeneous, dispersible with difficulty and have a tendency to form agglomerates. These disadvantages render the particles inappropriate for the preparation of magnetic recording layers. Numerous processes have been recently proposed to remedy these disadvantages, such as hydrothermal synthesis or improved processes of coprecipitation. Current synthesis processes for obtaining Ba and Sr hexaferrites result in particles in the form of hexagonal platelets.

It is desirable to improve both the dispersibility and the magnetic properties of hexaferrite particles. In known precipitation processes a barium or strontium salt is contacted with a carbonate to coprecipitate the barium or strontium carbonate and iron hydroxide. Because barium and strontium hydroxides are partially soluble, when they are used in the coprecipitate the desired stoechiometry of hexaferrite cannot be obtained unless large excesses of Ba or Sr are used. Therefore hydroxides have been avoided and replaced by insoluble carbonates, even at neutral pH. During the washing of the coprecipitate, there is no loss of barium and strontium and the amount of reactants involved is the stoechiometric amount. The presence of carbonate in the coprecipitate, however, renders the final product heterogeneous. Because Ba and Sr carbonate grains are bigger than iron hydroxide grains, the iron-Ba/Sr mixture is not uniform sized and during crystallization, heterogeneities appear.

Japanese patent application 62052133 discloses the preparation of Ba hexaferrite particles by coprecipitating a ferrous salt in the absence of carbonate ions. The comparative example below shows that the particles obtained by that process do not exhibit the advantageous characteristics of the particles obtained according to the present invention, and in particular magnetic properties such as magnetization and switching field distribution.

The switching field distribution (SFD) characterizes the width of the switching field distribution. From the hysteresis loop (magnetic flux M versus magnetizing field H), the half-bandwidth value $\Delta H$ of the curve dM/dH derived from the loop can be calculated for obtaining SFD.

The lower the SFD, the more the magnetic moments of the particles switch for a field close to the coercive field. These flux transitions upon magnetic recording will be thus better defined, the thickness of the recorded layer will be lower and better defined giving a lower background noise and a higher signal/noise ratio, in particular for higher information densities. To solve the problem of the increase of signal/noise ratio, the SFD should be decreased. A low SFD indicates also a narrow distribution of the particle sizes.

SUMMARY OF THE INVENTION

The present invention concerns a process for preparing Ba or Sr hexaferrite particles which allows to obtain magnetic particles which are easily dispersed in binders used currently for magnetic media, and which exhibit an improved homogeneity of the particle sizes, an improved magnetization and a lower distribution of the switching fields. The process includes coprecipitating a iron salt and a barium or strontium salt in alkaline medium, filtering, washing and drying the hydroxide precipitates obtained and heating at temperatures between 750° and 950° C. to crystallize hexaferrites. The process is characterized in that the coprecipitation medium is free from $CO_3$—ions during precipitation, and after coprecipitation, the reaction medium is neutralized until a pH between about 7 and 10 is obtained. After filtration, the iron hydroxide/Ba or Sr hydroxide precipitate is washed with an aqueous solution of a Ba or Sr salt buffered at a controlled pH having a concentration between $2 \times 10^{-3}$ and 0.2M.

When it is desired to lower the coercive field of the particles obtained, doping metal such as Ni, Co, Ti, Cu, Sn or any other doping agent known in the art is introduced. For example, a salt of the doping metal can be introduced in the precipitation medium at the amount desired in order to coprecipitate the hydroxide of that metal with the iron and Ba or Sr hydroxides. This process facilitates obtaining particles having a narrow switch field distribution, without loss of Ba/Sr and therefore without loss in magnetization.

The present invention also relates to the Ba or Sr doped or non-doped hexaferrite particles obtained by process disclosed. Compared to particles obtained with the prior art co-precipitation process, the particles of the present invention exhibit a higher coercive field and a higher magnetization and a ratio of the switching field distribution to the coercive field (SFD/Hc) at least as high. The coercive field and SFD depend on the particle nature, this is why the SFD/Hc is a better comparative value than the SFD and varies in the same direction.

An object of the present invention is Ba or Sr hexaferrite particles prepared by the above process.

Another object of the present invention is a recording magnetic product containing Ba or Sr hexaferrite particles prepared by the above process. The recording product can be in any known form such as tapes, discs, or cards. It is particularly useful in the magnetic medium of a magnetic mass memory card disclosed in the patent application filed the same day by the Applicant and entitled "Magnetic mass memory card and manufacturing process".

DESCRIPTION OF THE PREFERRED EMBODIMENT

According to an embodiment, the starting product is a ferric salt such as a nitrate, a bromide, an iodide, a fluoride, etc. and a Ba or Sr salt such as a chloride, which is coprecipitated in alkaline medium free from carbonate. After neutralization and filtration, the precipitate is washed with a Ba or Sr salt solution such as a chloride or a nitrate, at a concentration between $2 \times 10^{-3}$ and 0.2M and preferably between $4 \times 10^{-3}$ and $40 \times 10^{-3}$M. The coprecipitate is dried, then heated at a temperature between 700° C. and 950° C. and preferably between 800° and 850° C. The particles obtained are in the form of platelets.

According to a preferred embodiment the starting product is a ferrous salt. By coprecipitation with a Ba or Sr salt and by oxidation, α-hydrated ferric oxide (goethite) containing Ba or Sr is obtained as a precursor. This preferred embodiment allows you to obtain hexaferrites in the form of the goethite precursor, i.e. needles or nodules.

Preferably, to prepare the precursor, the process disclosed in European Patent 45,246 can be used. In that process, a reducing agent is used in an alkaline precipitation medium before oxidation to avoid the presence of ferric ions at the beginning and then to control the oxidation. In this way, unwanted by-products are avoided. The appropriate reducing agent must not form insoluble precipitates with Ba or Sr and should be active under the pH conditions of the process. The reduction can be carried out electrochemically with appropriate electrodes. Preferably, the redox potential of the reducing agent should be less than 1 volt. Possible reducing agents are stannous chloride, dihydroxy benzene, or hydroxylamine. The amount of reducing agent is a function of the concentration of ferric ions in solution.

According to that process, to a solution of a ferrous salt (e.g. ferrous chloride, bromide, iodide, fluoride, or nitrate, etc.) is added the educing agent in an amount such that no $Fe^{3+}$ ions are detected by a colorimetric test (e.g. with KSCN). To that solution, is added a Ba or Sr salt such as a chloride or a nitrate. A slight acidification with HCl can help with the dissolution.

Preferably, that solution is introduced slowly (in general in 10 minutes) into an aqueous alkaline hydroxide solution (Na or K solution) forming a 25–600% excess and preferably a 100–200% excess based on the total salt. The solution temperature can be between 0°–100° C. Preferably, the salts are finely dispersed in the aqueous alkaline hydroxide solution without contacting any oxidizing agent, e.g. by means of the device disclosed in French Patent 1,157,156 referred to as "Flying saucer".

Ferrous hydroxide is then oxidized so as to obtain precursor particles by passing an oxidizing gaseous stream. Air is a pretty good oxidizing agent. Best results are obtained if the gas is finely distributed in all the solution. The oxidation temperature may vary from 0° to 100° C., depending on the desired form of the particles. Preferably, it is less than 60° C. and more preferably less than 40° C.

The air flowrate for 1 liter of solution is generally comprised between 5 and 60 l/h but higher flowrates can also be used. The end of oxidation is determined by following the $Fe^{2+}/Fe^{3+}$ potential. When $Fe^{2+}$ concentration becomes nil, the potential changes very fast according to well-known redox equations.

After having obtained the precursor, ripening can be carried on at 90° C. for ½ to 1 hour. Precursor concentrations are those disclosed in European Patent 45,246, i.e. from 10 to 40 g/l in general. The alkaline excess is from 25 to 600%, in general from 100 to 200%.

The solution is then filtered. In a batch process, the precipitate is redispersed in a minimum amount of water and the alkaline excess is neutralized with a diluted acid solution ($HNO_3$ or HCl) to bring back the pH between 7 and 10. In a continuous process, after having removed most of the aqueous phase, it is possible to recirculate water, the pH being maintained from about 7 to about 10.

The salts contained in said water are then removed by repeated washings with a diluted solution of Ba or Sr salt, which could be partially recirculated. The concentration of the solution is in the range of $2 \times 10^{-3}$ mole/l and 0.2 mole/l, preferably between $4 \times 10^{-3}$ and $40 \times 10^{-3}$ mole/l. If the concentration is too high, the surface is impregnated with Ba or Sr, and the magnetic properties of the final product are altered. The coercive field decreases and a second population of particles having low coercive fields appears. The pH of that solution is maintained at a determined value by adding a certain amount of $NH_4OH$. Such value differs according to the hexaferrite nature. It is $8.0 \pm 0.1$ for Ba hexaferrite and $10.0 \pm 0.1$ for Sr hexaferrite.

This washing process avoids the dissolution of Ba or Sr in the washing waters, which allows carrying out syntheses with stoichiometric amounts of reactants. The product is then filtered, dried, and heated at a temperature ranging from 750° to 950° C. and, preferably from 800° to 850° C., for 2 to 4 hours to crystallize Ba or Sr ferrite particles.

The particles obtained after thermal treatment keep the shape of the initial precursor. Their diameter is in the range of 0.02 to 0.1 μm, their length in the range of 0.02–0.5 μm.

It is possible upon the growth of the precursor in aqueous solution to modify the shape of the particles with growth modifiers, as those cited in patent WO 86/05026, such as pyrogallol. Without growth modifier, the acicularity, diameter and length of the resulting needles depends on the oxidation temperature, on the concentration and flow rate of the oxidizing gas.

Magnetization and coercive fields are measured with a VSM (Vibrating Sample Magnetometer) at a maximum magnetizing field of 20,000 Oe (1590 kA/m). Such values depend on the oxidation temperature and on the alkaline excess. By controlling both parameters, non-doped hexaferrite particles having a saturation magnetization higher than 60 emu/g, a coercive field higher than 5,000 Oe (400 kA/m) and a SFD/HC less than or equal to 0.4 can be obtained.

EXAMPLE 1—(Control)

An alkaline aqueous solution was prepared by dissolving 44 g (1.1 mole) of NAOH in 0.6 l of distilled water. The preparation was heated to 55° C. Then in 190 ml of distilled water acidified with 10 ml of HCl 1N, were dissolved 53.7 g of $FeCl_2,4H_2O$ (0.27 mol) and 0.2 g of $SnCl_2,2H_2O$ ($8.8 \times 10^{-4}$ mol) were introduced. The absence of $FeI^{3+}$ ions in solution was checked with KSCN. After that, 5.5 g of $BaCl_2,2H_2O$ ($22.5 \times 10^{-3}$ mol) were introduced in the solution. This amount corresponds to the BaFe12O19 stoechiometry in the final product. The latter solution previously heated to 55° C. was gently poured (10 mn) under strong stirring in the alkaline solution.

The resulting precipitate was oxidized by air stream (30 l/h) and uniformly scattered in the solution by means of sintered glass. The $Fe^{++}/Fe^{+++}$ potential of the solution was measured. Three hours later, it quickly passed from about $-800$ mV to $-200$ mV. The precipitate was filtered and washed with distilled water until the pH of the water at the output of the filter was about 8 to 9. After drying it was heated 3 hours at 830° C.

The results are given in Table 1.

EXAMPLE 2—(Control)

The procedure of example 1 was repeated, except that the precipitate was not washed but redissolved in 150 cc of water. The NAOH excess was neutralized with 21 ml of 1N HCl (pH about 7). The solution was then filtered and washed with 500 cc of distilled water to remove the residual salts ($Na^+$ concentration $<10^{-3}M$). After drying, the precipitate was heated at 830° C. for 3 hours.

The results are given in Table I.

EXAMPLE 3 (Invention)

The procedure of Example 1 was repeated except that the precipitate was not washed but redispersed in 150 cc of water. The NAOH excess was neutralized with HCl 1N to lower the pH to 8, then the precipitate was filtered and washed with 500 cc of a $8\times10^{-3}M$ $BaCl_2,2H_2O$ solution having a pH adjusted at $8.0\pm0.1$ with $NH_4OH$. After drying, the precipitate was treated three hours at 830° C.

The results are given in Table 1. It is apparent that saturation magnetization is significantly higher for the particles obtained by the process of the invention than for controls 1 or 2.

TABLE I

| Examples | Im* emu/g | Hc-Oe** (kA/m) | SFD-Oe kA/m | SFD/Hc |
|---|---|---|---|---|
| 1 (Control) | 36.6 | 4400 (350) | 2200 (175) | 0.5 |
| 2 (Control) | 39.5 | 4750 (378) | 1850 (148) | 0.39 |
| 3 (Invention) | 59 | 4650 (370) | 2100 (167) | 0.45 |

*Im = saturation magnetization
**Hc = coercive field

EXAMPLE 4 (Control)

An alkaline aqueous solution was prepared by dissolving 29 g (0.72 mole) of NAOH in 0.6 l of distilled water, and heating to 35° C. 36 g of $FeCl_2,4H_2O$ (0.181 mole) were dissolved in 190 ml of distilled water acidified with 10 ml of 1N hydrochloric acid and 0.2 g of $SnCl_2,2H_2O$ ($8.8\times10^{-4}$ mole) were added. The absence of ferric ions in solution was checked with KSCN. 4.4 g of $BaCl_2,2H_2O$ ($18\times10^{-3}$ mole) were added. This amount corresponds to a 20% Ba excess compared to the stoechiometry of the final product $BaFe_{12}O_{19}$. This solution previously heated at 35° C. was introduced slowly in 10 minutes under strong stirring in the alkaline solution.

Then the procedure of Example 1 was repeated, the results are given in Table II.

EXAMPLE 5 (Control)

The procedure of Example 3 was repeated except that the precipitate was not washed but solubilized and neutralized as in Example 2. The results are given in Table II.

EXAMPLE 6 (Invention)

The procedure of Example 3 was repeated except that the precipitate was not washed but redispersed with HCl 1N to lower the pH to 8, then the precipitate was filtered and washed with 500 cc of a $8\times10^{-3}M$ $BaCl_2,2H_2O$ solution having a pH adjusted at $8.0\pm0.1$ with $NH_4OH$. After drying, the precipitate was heat treated 3 hours at 830° C. The results are listed in Table II. In that case the saturation magnetization was higher than for controls of Examples 3 or 4.

TABLE II

| Examples | Im* emu/g | Hc-Oe** (kA/m) | SFD-Oe kA/m | SFD/Hc |
|---|---|---|---|---|
| 4 (Control) | 38.4 | 5100 (406) | 1770 (141) | 0.34 |
| 5 (Control) | 37 | 5074 (404) | 1661 (132) | 0.32 |
| 6 (Invention) | 61.7 | 5290 (421) | 1800 (143) | 0.34 |

*Im = saturation magnetization
**Hc = coercive field

EXAMPLE 7 (Comparative)

This example was carried out according to the procedure of Example 1 of Japanese Patent Application 6252133.

9.16 g of $BaCl_2,2H_2O$ ($37.5\times10^{-3}$ mole) were dissolved in a 240 ml solution containing 59.6 g of $FeCl_2,4H_2O$ (0.3 mole) which corresponds to a 50% Ba excess with respect to the stoechiometry. 60 g of NAOH and water were added to obtain 1 liter. The $Fe(OH)_2$ alkaline suspension was heated, and an air stream where $CO_2$ had been removed was passed at 40° C. and at a flowrate of 250 l/h. After 5 hours, ferrous ions were converted into ferric ions. The precipitate was filtered, washed with water and dried at 80° C. and heat treated at 830° C. for 3 hours. The results were the following:
Im = 52.9 emu/g
Hc = 5028 Oe (400 kA/m)
SFD = 2820 Oe (225 kA/m)
SFD/Hc = 0.56

The process disclosed in the Japanese Patent Application 6252133 did not provide both the low SFD/HC and the high magnetization of the particles according to the invention.

EXAMPLE 8 (Invention)

The procedure of Example 3 was repeated with an oxidation temperature of 25° C., a concentration of 25 g/l, and by replacing $BaCl_2,2H_2O$ by an equivalent amount of $SrCl_2,2H_2O$. The precipitate was neutralized to a pH of 10. The washing after filtration was carried out with a $16\times10^{-3}M$ $SrCl_2,2H_2O$ solution having a pH adjusted to $10.0\pm0.1$ with $NH_4OH$. After drying, the precipitate was heat treated for 2 hours at 830° C.

The characteristics were the following
Im = 61.7 emu/g
Hc = 470 kA/m (5900 Oe)
SFD = 169 kA/m (2120 Oe)
SFD/Hc = 0.36.

EXAMPLE 9 (Control)

25 g of $Fe(NO_3)_3, 9H_2O$ were dispersed in 70 ml and heated at 60° C. Then 1.26 g of $BaCl_2, 2H_2O$ was added, solubilized in acid pH and with heat.

Another solution containing 13.8 g of $K_2CO_3$ and 11.2 g of KOH in 70 ml of water was prepared. The reaction was exothermic and the temperature adjusted at 60° C.

The salt solution was introduced in the basic solution and the mixture of iron hydroxide and barium hydroxide precipitated. The stirring was such that the solution, remained homogeneous. After filtering and washing, the product was dried, then heat treated at 800° C. for 3 hours to crystallize Barium ferrites $BaFe_{12}O_{19}$. The results were the following:

Im 60 emu/g
Hc 421 kA/m (5290 Oe)
SFD 199 kA/m (2500 Oe)
SFD/Hc = 0.47

EXAMPLE 10 (Invention)

The above procedure was repeated except that the basic solution contained 12 5 g of KOH in 70 ml of water.

On the other hand, the washing of the precipitates was carried out (as above explained) with a $BaCl_2, 2H_2O$ solution (2 g/l) up to neutrality. The results were the following:

Im = 62 emu/g
Hc = 395 kA/m (4900 Oe)
SFD = 135 kA/m (1700 Oe)
SFD/Hc = 0.34

In that embodiment both the increase in the saturation magnetization and lowering of the Switch Distribution Field could be observed.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A process for preparing strontium or barium hexaferrite platelet particles, comprising:
   coprecipitating an iron salt with a barium or strontium salt in alkaline medium, filtering, washing and drying the precipitate of hydroxides obtained, then heating at a temperature between 750° C. and 950° C. to crystallize hexaferrite platelet particles, wherein
   the coprecipitation medium is free from $CO_3$—ions during coprecipitation;
   after coprecipitation, the medium is neutralized until a pH between 7 and 10 is obtained; and
   after filtration, the coprecipitate formed of iron hydroxide and Ba or Sr hydroxide is washed with an aqueous solution of a barium or strontium salt, having a concentration between $2 \times 10^{-3}$ and 0.2M, the aqueous barium salt solution being used in the preparation of barium hexaferrite particles and is buffered at a pH of $8.0 \pm 0.1$ and the aqueous strontium salt solution being used in the preparation of strontium hexaferrite particles and is buffered at a pH of $10.0 \pm 0.1$.

2. A process according to claim 1, wherein the concentration of the Ba or Sr SgH solution is between $4 \times 10^{-3}$ and $40 \times 10^{-3}$M.

3. A process according to claim 1, wherein the coprecipitate of hydroxides obtained is heated at a temperature between 800° C. and 850° C.

4. A process according to claim 1, wherein the iron salt is a ferric salt.

5. A process according to claim 1, wherein the iron salt is a ferrous salt and the coprecipitate of hydroxides obtained is oxidized.

6. A process according to claim 5, wherein oxidation is obtained by means of an air stream at a temperature between 0° and 100° C.

7. A process according to claim 5, wherein oxidation is obtained by means of an air stream at a temperature below 60° C.

8. A process according to claim 5, wherein oxidation is obtained by means of an air stream at a temperature below 40° C.

9. A process according to claim 5 wherein a reducing agent is added in the precipitation medium.

10. A process according to claim 9, wherein the reducing agent is stannous chloride, dihydroxybenzene or hydrozylamine.

* * * * *

UNITED STATES PATENT AND TRADEMARK OFFICE
CERTIFICATE OF CORRECTION

PATENT NO. : 5,135,733
DATED : August 4, 1992
INVENTOR(S) : Jean-Christophe Robert et al It is certified that error appears in the above-indentified patent and that said Letters Patent is hereby corrected as shown below:

| | | |
|---|---|---|
| Title Page Abstract | | "$2 \times 10^{-3} 0.2$" should read --$2 \times 10^{-3}$-$0.2$-- |
| Column 4, line 66 | | "$Fel^3$" should read --$Fe^3$-- |
| Column 5, line 1 | | "$BaFel2019$" should read --$BaFe_{12}O_{19}$-- |
| Column 7, line 24 | | "12 5" should read --12.5-- |
| Column 8, line 27 | Claim 2, line 21 | "SgH" should read --salt-- |
| Column 8, line 50 | Claim 10, line 15 | "hydrozylamine" should read --hydroxylamine-- |

Signed and Sealed this

Twenty-sixth Day of October, 1993

Attest:

BRUCE LEHMAN

Attesting Officer

Commissioner of Patents and Trademarks